Jan. 12, 1965 S. UNTERMYER II 3,165,446
NUCLEAR REACTOR POWER MONITOR
Original Filed Feb. 13, 1959 2 Sheets-Sheet 2
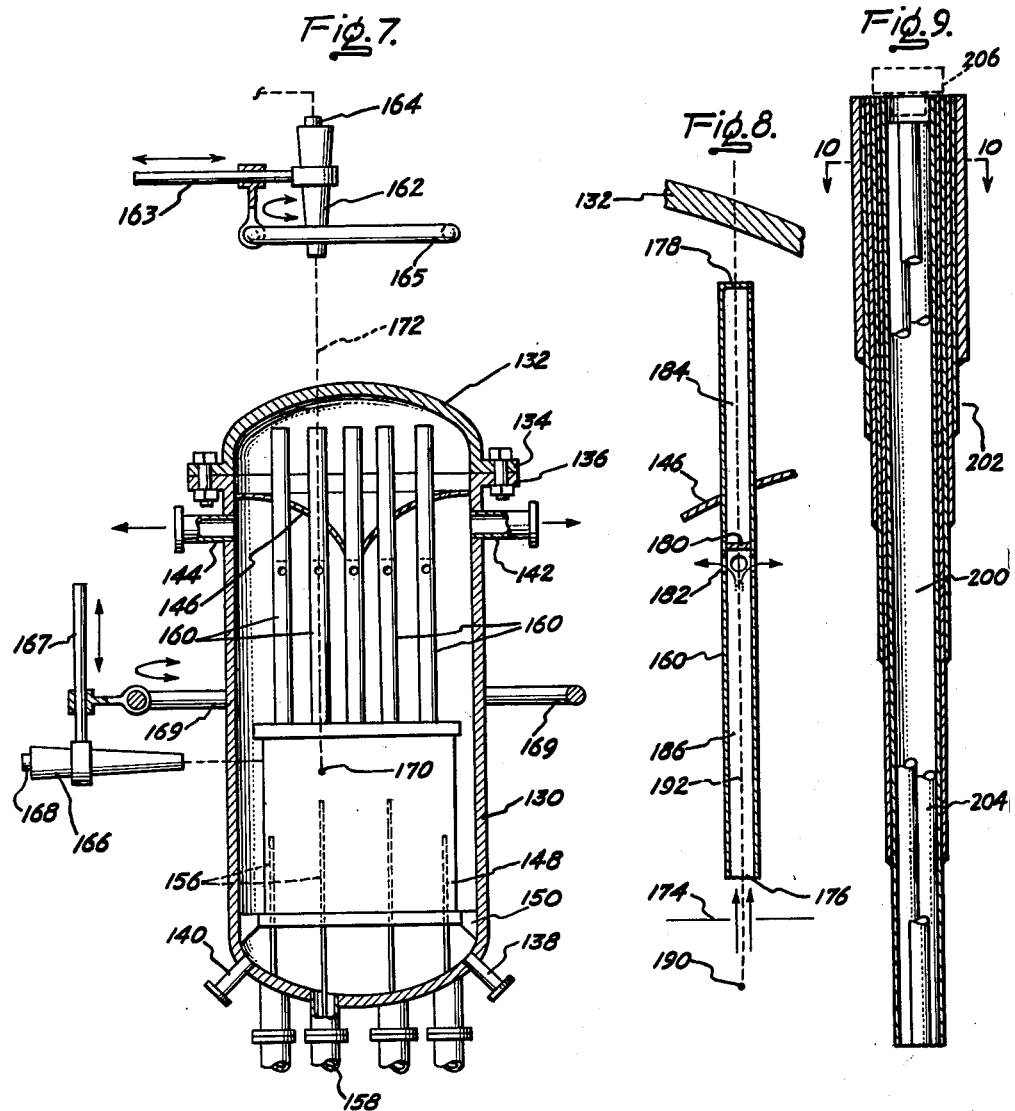
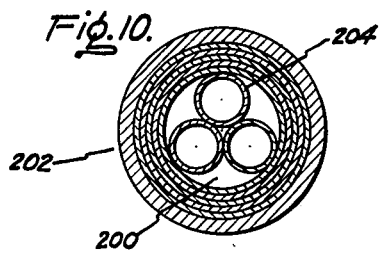
INVENTOR.
SAMUEL UNTERMYER II
BY
ATTORNEY.

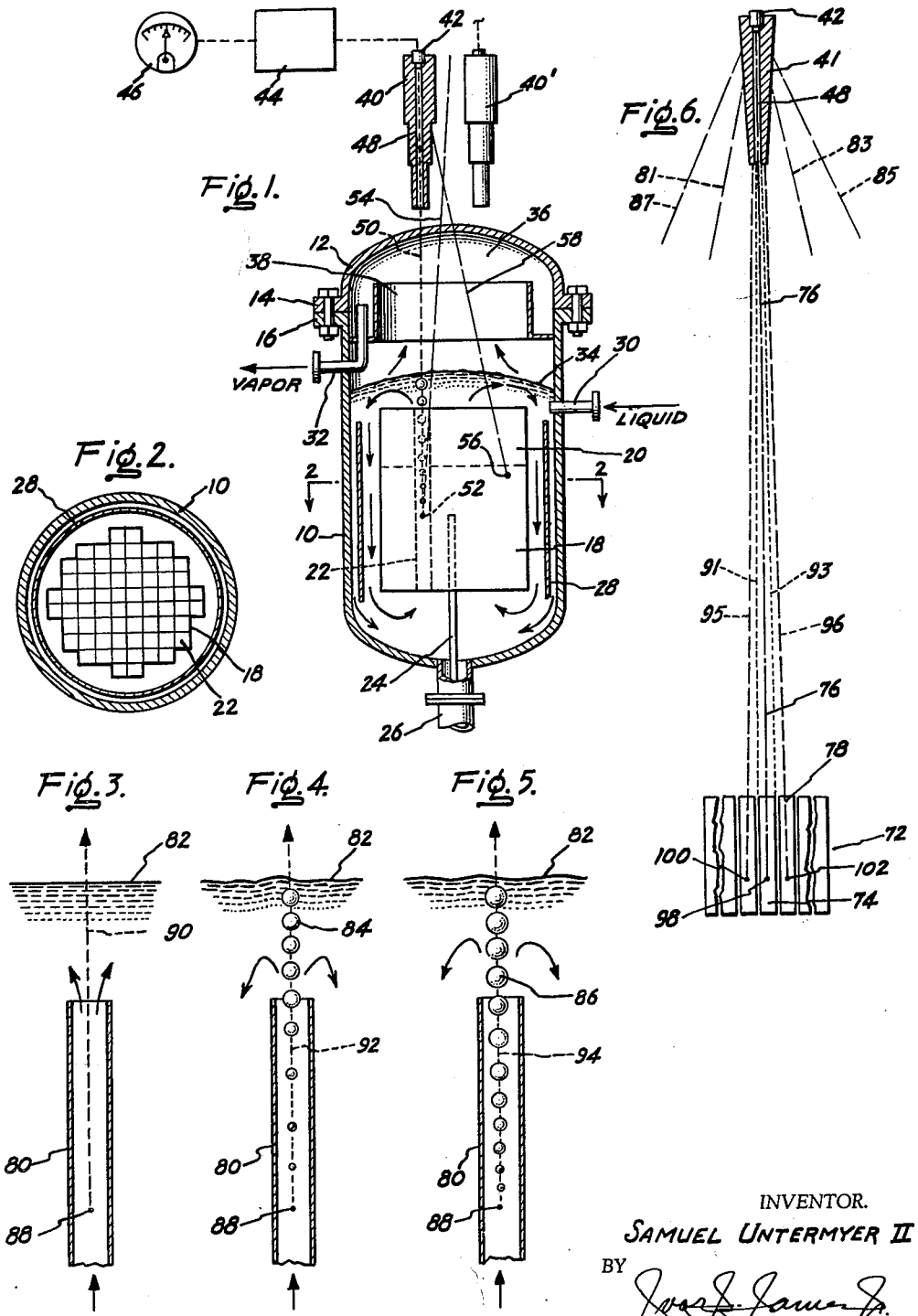

United States Patent Office 3,165,446
Patented Jan. 12, 1965

3,165,446
NUCLEAR REACTOR POWER MONITOR
Samuel Untermyer II, Atherton, Calif., assignor to General Electric Company, a corporation of New York
Continuation of application Ser. No. 793,117, Feb. 13, 1959. This application Dec. 26, 1962, Ser. No. 247,404
11 Claims. (Cl. 176—26)

This invention relates to the operation of nuclear reactors, and in particular it relates to an improved method and apparatus for monitoring the rate of energy liberation or power level at various locations throughout the length and across the transverse cross-section of a nuclear reactor core.

The release of large amounts of energy through nuclear fission reactions is now quite well known. In general, a fissionable atoms such as $U^{233}$, $U^{235}$, or $Pu^{239}$ absorbs a neutron in its nucleus and undergoes a nuclear disintegration. This produces on the average, two fission products of lower atomic weight and great kinetic energy, and several fission neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes, or rods. These fuel elements are usually provided on their external surfaces with a corrosion-resistant non-reactive cladding which contains no fissionable or fertile material. The fuel elements are grouped together at fixed distances from each other in a coolant flow channel or region as a fuel assembly, and sufficient fuel assemblies are combined to form the nuclear reactor core capable of the self-sustained fission reaction referred to above. The core is usually enclosed within a reactor vessel.

The control of nuclear reactors is ordinarily affected by means of a movable control element placed in the core and containing a nuclear reaction poison, that is, a material containing a significant number of atoms which have relatively large non-fission neutron capture or absorption cross-sections. The control problem is unusually difficult in power reactors of high thermal rating and which have large cores. In such cores, relatively large local changes in reactivity and power can occur in a region surrounding the particular control element which is moved without significant affect upon the total reactor power. Control elements disposed uniformly through such a core are required to control such local regions more or less individually and thus maintain suitable control over the reactor. Desirably such large reactors are controlled so that each region liberates energy at equal rates, that is, each unit volume of the reactor core is operated at the same power level. This situation results in uniform fuel temperatures, neutron fluxes, and fuel burnup or life. However, in order to achieve this situation, it is necessary to determine the relative power level at which the various individual regions of the core are operating at given time so that many control elements may be moved simultaneously to avoid local "hot spots" of excessively high power.

Previously this power level determination has been affected in several distinct ways. In some reactors which are provided with nuclear fuel contained in individual coolant flow channels, the temperature rise of the coolant as it passes through a given channel is measured. This temperature increase, together with the coolant flow rate, permits a determination of the power level at which the fuel in that particular channel operates. A second system includes the placement in the reactor core of thermal neutron detectors, such as a thermocouple coated with a fissionable isotope or an ion chamber lined with such an isotope, to permit a determination of the thermal neutron flux. This value, taken with the known concentration of fissionable isotopes in the fuel, permits an estimation of the power level in a given part of the reactor. A third power monitoring system involves the placement in the core of foils or wires made of materials, such as copper or indium for example, which are activated in a manner and to an extent dependent upon the neutron flux or power level at the point of placement. A fourth power monitoring system which is adapable to boiling reactors involves removing a sample of the mixed phase coolant from the core and passing it through a calorimeter to determine the heat content of the effluent coolant. There are, of course, other systems which may be and have been used.

Unfortunately, all of the power monitoring systems referred to above suffer from one or more serious disadvantages. They all require penetration of the reactor pressure vessel with electrical or other instrumentation leads with the possible exception of the third system which employs foils or wires within the core. This system, however, requires that the reactor be shut down and the foils or wires removed in order to determine the power level information. Further, those systems relying upon the irradiation of detectors containing fissionable material have to be recalibrated frequently since the fissionable material is consumed during the period of use. The measurement of coolant temperature rises is completely inoperable in a reactor where part of the coolant is vaporized in the coolant channel. Other disadvantages of these systems are well known to those who have attempted to obtain accurate results in applying them to the power monitoring of a nuclear reactor.

It is accordingly an object of this invention to overcome these disadvantages and provide an improved method and apparatus for determining the relative power and power distribution throughout a nuclear reactor core without the necessity of pressure vessel penetrations, the placement of extraneous or foreign materials in the reactor, or interfering with continuity of reactor operation.

It is a further object to utilize the penetrating radiation emitted from a nuclear reactor core to generate a signal which is proportional to the actual local power level in a given region of the core, the signal being such that a relatively large error in the determination of the signal does not interfere with an accurate determination of the local power level.

An additional object is to provide for the control of large nuclear power reactor cores to maintain uniform or other predetermined power distributions therein.

Another object of this invention is to provide a nuclear reactor power monitoring system in which all sensitive equipment and detectors are disposed remotely from the core, such as outside the reactor vessel, so that they may be maintained and serviced during reactor operation.

A further object of this invention is to provide a power monitoring system in which a single coolant flow channel or a section of a reactor containing a plurality of coolant flow channels is monitored by means of a simple mechanical arrangement which may be located entirely outside of the reactor vessel, which does not require vessel penetrations, and which does not interfere with continuous reactor operation.

Other objects and advantages of this invention will become apparent to those skilled in the art as the description and illustration thereof proceed.

Briefly, the present invention comprises a method for operating a nuclear reactor, and a nuclear reactor power level monitoring method and apparatus including the steps of and means for collimating the penetrating radiation emitted from a nuclear chain reacting assembly or core, and which passes through any pressure vessel or container and any coolant or moderator which may be present along the radiation path, and detecting the collimated radiation by means of a radiation detector located remote from the reactor core to measure the radiation intensity to provide a signal or other information bearing a predetermined relation to the rate of energy liberation or power level in a particular region of the core from which the detected radiation is emitted. The core region monitored may be a single selected nuclear fuel-containing coolant flow channel, or a group of channels adjacent one another. Significant information can be obtained by "viewing" any radiating surface of a reactor core. The radial power distribution is most precisely obtained by detecting collimated penetrating radiation emitted axially from an end of each coolant flow channel in the core to obtain the relative power level of each channel. The axial power distribution can be determined by detecting the collimated penetrating radiation emitted laterally from the lateral surface of the core at a sufficient number of points on an imaginary cylinder coaxially surrounding the reactor core.

The radiation attenuation or absorption varies with changes in the density and therefore the temperature of the coolant or the moderator through which it passes. The coolant temperature in turn varies with the power level of the fuel in the coolant flow channel or channels from which it issues whereby the collimated radiation has an intensity which is a direct function of the power level. The variation in attenuation with temperature occurs in all liquids; it is pronounced in hydrogeneous liquids, such as the hydrocarbons, water, etc., and it is extreme in the case of a boiling reactor where vapor voids are present. Either single or multiple and either stationary or movable detectors may be used to survey the penetrating radiation according to this invention. The collimation may be provided either immediately adjacent the reactor core, or immediately adjacent the detector, or both. The penetrating radiation contemplated includes fast neutron radiation, gamma ray radiation, or both.

The present invention will be more readily understood by reference to the accompanying drawings in which:

FIGURE 1 is a schematic elevation view of a nuclear reactor system including the simplest embodiment of the present invention;

FIGURE 2 is a transverse cross-section view of the reactor vessel and core shown in FIGURE 1;

FIGURES 3, 4, and 5 are schematic illustrations of the theory underlying the operation of the present invention;

FIGURE 6 is a schematic illustration of the penetrating radiation emitted from a reactor core and detected by a collimated detector;

FIGURE 7 is a cross-section view of another embodiment of the present invention applied to a large nuclear power reactor;

FIGURE 8 is a detail view of the cross-section of the internal collimating means used inside the reactor pressure vessel illustrated in FIGURE 7;

FIGURE 9 is a detail longitudinal view of the cross-section of an external collimating means suitable for use in this invention; and FIGURE 10 is a cross-section view of the collimator shown in FIGURE 9.

In FIGURE 1, nuclear reactor pressure vessel 10 is provided with removable head 12 connected by flanges 14 and 16. Reactor core 18, consisting of a plurality of individual nuclear fuel-containing assemblies or coolant flow channels, is supported within vessel 10 and may be provided with a chimney section 20 to enhance circulation of the coolant through the core. A representative fuel assembly 22 is indicated by broken lines. Control element 24, containing a nuclear reaction poison, extends upwardly into core 18 in order to control the nuclear fission reaction and is positioned by means of a control element drive mechanism 26. Core 18 is surrounded by a thermal shield 28 spaced apart from the inner wall of vessel 10 opposite core 18 to inhibit gamma ray heating of the pressure vessel.

Referring now briefly to FIGURE 2, a transverse section view of the nuclear reactor shown in FIGURE 1 is indicated. Pressure vessel 10 surrounds thermal shield 28 which in turn surrounds the nuclear reactor core 18 made up of a more or less circular group of parallel nuclear fuel-containing assemblies 22 of square cross-section and through which the moderating coolant passes.

Returning again to FIGURE 1, coolant inlet 30 and coolant outlet 32 are provided by means of which a liquid moderating coolant is introduced and removed from the reactor vessel. The reactor illustrated in FIGURE 1 is of the boiling coolant-moderator type. Liquid coolant is introduced through line 30 at a rate sufficient to maintain the body of liquid in the reactor vessel having an upper level 34 as indicated. The liquid flows downwardly through the more or less annular spaces on each side of the thermal shield 28, upwardly through the various fuel assemblies 22, and into the upper part of the liquid body where the vaporized portion is separated through liquid level 34. The liquid recirculates by natural convection in the direction indicated by the arrows. The vapor discharges into the vapor plenum 36, passes around deflector 38, and discharges through outlet line 32. A suitable moderating coolant is natural water.

Disposed immediately above the reactor pressure vessel is collimator 40 containing detector element 42 which in turn is connected to instrument means 44 provided with indicator 46. Collimator 40 consists of an elongated element having heavy walls and provided with a central opening or bore 48 of relatively small diameter which is axially aligned with or "aimed" at channel 22 in core 18 along radiation path 50. In fuel assembly 22 is an effective source 52 of penetrating radiation. This radiation is emitted in the direct line along path 50 into collimator bore 48, as well as in all other directions, one of which is represented by path 54. Another representative source of penetrating radiation is indicated at 56 in another part of core 18 and out of direct path 50. A plurality of such collimators may be employed to monitor various parts of core 18 and an additional such collimator 40' is also shown.

Part of the penetrating radiation from source 52 passes upwardly along direct path 50 through the effluent coolant from fuel assembly 22 and into collimator bore 48 where it actuates detector 42. The penetrating radiation emitted from source 52 other than along direct path 50, such as along paths represented by path 54, does not enter collimator bore 48 and does not actuate detector 42. Radiation from other parts of core 18, such as that from source 56, which may be emitted along a direct path 58 toward detector 42 does not enter collimator bore 48 because of the misalignment of path 58 with the bore, and further does not effectively actuate detector 42 because it is attenuated to a significant extent in passing more or less longitudinally but at a slight angle through the walls of collimator 40. The collimator walls are made of material selected to attenuate efficiently all such extraneous radiation. Accordingly, by far the strongest signals generated by detector 42 result from penetrating radiation emitted from sources such as 52 existing in the fuel assembly 22 directly aligned with bore 42 of the collimator.

The degree of attenuation of this penetrating radiation as it passes along path 50 is strongly affected by the density and therefore the temperature of the coolant and/or moderator present along the path. The presence of high temperature coolant, and especially the presence of voids of vaporized coolant, along this path reduces the attenuation from that which would occur if the coolant were colder or were without voids. Accordingly, the signal generated at detector 42 from radiation source 52 is an inverse function of the coolant or moderator density and a direct function of the coolant or moderator temperature and the rate of energy release or power level in the fuel assembly monitored. Due to the efficient shielding effect of the walls of collimator 40, extraneous radiation from sources outside of fuel assembly 22 is attenuated.

Detector 42 is connected by suitable means to instrument 44 in which the detector signals may be amplified, various signals may be discriminated on the basis of radiation energy, and the signals may be rectified to produce a direct current or other signal which is proportional to the intensity of the radiation arriving at detector 42. This signal may be used to actuate indicator 46 to give a reading which is a direct measure of the relative power level in fuel assembly 22.

As applied to a boiling reactor, which is moderated and cooled by natural water, that is, the natural mixture of water isotopes, the present invention operates as follows. The present invention measures the outlet steam voids from boiling channel 22 by measuring the attenuation of penetrating reactor radiation in passing through the steam-water mixture leaving channel 22 in the reactor core. Whereas either gamma or neutron radiation might be used, in a preferred embodiment a fast neutron detector such as a Hornyak button, hereinafter more fully described, or a $U^{238}$ fission counter, is used. These detectors can be adjusted by means of a suitable discriminator circuit to measure only fast neutrons above 1 m.e.v., and they can be set to reject other types of radiation such as fission gamma rays. This fast neutron detector is mounted at a convenient location above the top of the reactor pressure vessel. Fast neutrons are produced by fission of fuel near the top of the reactor core in fuel assembly 22. In order to reach detector 42, these neutrons must pass along path 50 through a sample of steam-water mixture discharged from fuel assembly 22. They pass through a collimator 40 which is aligned with or "aimed" at the fuel assembly flow channel to be monitored. While neutrons may also reach detector 42 by being scattered into the line of the collimator from other parts of the reactor, such neutrons will be attenuated by the additional distance they must travel through the coolant and they will be reduced in energy due to the scattering so that they will not be counted by the detector.

In FIGURES 3, 4, and 5 are shown highly schematic diagrams illustrating a nuclear fuel-containing coolant flow channel to explain the variation in attenuation of the penetrating radiation as a function of the power level at which the fuel in the channel operates. In these figures the flow channel walls are indicated at 80 with the coolant being introduced at the bottom and discharged at the top in the manner indicated. The nuclear fuel is contained between the walls 80, but is not shown since illustration is unnecessary to the explanation. The body of liquid coolant is indicated as having a level 82 and in FIGURES 4 and 5 the presence of vapor voids 84 and 86 indicate the coolant is being boiled. In each case a source 88 of penetrating radiation is indicated in the channel.

FIGURE 3 may be taken to illustrate the situation which exists in a nuclear reactor through the flow channels of which the coolant passes without boiling. The coolant temperature rises from some inlet value to a high outlet value below the boiling point as it passes through the channel. The attenuation of penetrating radiation is a direct function of the number of collisions with atoms of the material or of the opacity of the material through which it passes. For example, fast neutron radiation emitted at source 88 and progressing along path 90 is attenuated to an extent which is a direct function of the density of the coolant. As the power level rises, the temperature rise of the coolant in the channel increases, the density of the coolant discharging from the channel decreases, the attenuation of the radiation decreases, and thus the radiation intensity at the point of detection increases. The detector signal is thus a direct function of the power level.

All liquid coolants normally used to remove heat from or moderate nuclear reactors have densities which decrease with increasing temperature. The present invention, therefore, is applicable to monitor the power of these liquid cooled or liquid moderated nuclear reactors. Some representative nuclear reactors include liquid materials such as bismuth, lithium, mercury, sodium, potassium, the NaK alloy, the hydrogeneous liquids such as terphenyl, diphenyl, other refractory high-boiling hydrocarbons, light or natural water, heavy water, and the like.

FIGURE 3 also illustrates the non-boiling condition which exists in a boiling reactor prior to attainment of temperatures sufficient to vaporize the coolant. For example, at 1000 p.s.i. operating pressure, the boiling point of pure water is about 545° F. At 540° F., for example, no net power is liberated from such a reactor since no steam is generated. At this point, however, the attenuation of radiation from source 88 in passing upwardly through the non-boiling channel is some fixed value dependent upon the intensity of the source and the distance through the hot non-vaporized coolant to liquid level 82.

When the power level is increased slightly, the increased heat liberated raises the temperature to the saturation value, vaporizes part of the coolant, and the condition which then exists is shown in FIGURE 4. Here steam coolant vapor voids 84 form and rise through channel 80 toward liquid level 82 due to their own buoyancy and the net upward movement of the liquid coolant by convection in the channel. Voids 84 along the radiation path 92 present regions of substantially decreased density and therefore substantially less attenuation of the radiation occurs in these regions. Compared with the non-boiling condition, as shown in FIGURE 3, the attenuation is lower in FIGURE 4 and accordingly the detected radiation intensities will be higher.

A further increase in power level has the effect of increasing the size of the vapor voids 86 as shown in FIGURE 5. With the higher power levels, the fraction of vapor in the coolant discharged from channel 80 increases, still less attenuation of the radiation occurs as it passes from source 88 along path 94, and the detected radiation intensity is still higher.

The power monitoring system of this invention thus may be used to detect differences in power level in both non-boiling and boiling reactors, and is particularly sensitive to power level changes in the boiling type of reactor because a greater change in the degree of attenuation is caused when coolant voids are formed.

EXAMPLE I

This invention was tested in the operation of a nuclear power reactor rated at 25 thermal megawatts and which was moderated and cooled by boiling natural water. The detector element was a Hornyak button provided with a mild steel collimator and was positioned above the head of the reactor pressure vessel substantially as indicated in FIGURE 1. The reactor core was provided with seven control elements, six such elements grouped around the central seventh element. The total reactor power in this example was varied by moving only the central control element while the six outer elements were completely withdrawn from the core. The monitor of this invention was aligned with that region of the core adjacent one of these outer control elements. The data obtained in this operation were taken for three power levels, specifically 5, 15 and 25 thermal megawatts. The data taken are as follows:

*Table I*

| Reactor Power, Thermal Megawatts | 5.0 | 15 | 25 |
|---|---|---|---|
| Power, Per Cent of Rating | 20 | 60 | 100 |
| Effluent Coolant: | | | |
| Vapor Fraction, Volume Percent | 9 | 24 | 34 |
| Liquid Fraction, Volume Percent | 91 | 76 | 66 |
| Counts per Minute | 550 | 12,000 | 36,000 |
| Counts per Minute per Megawatt | 110 | 800 | 1,440 |

It may be seen from these data that the counts per minute per megawatt vary in the present invention approximately logarithmically with the fraction of vapor phase in the effluent coolant. Thus at high power levels slight changes in power level result in relatively large changes in the number of counts per minute per megawatt. This means that even a substantial inaccuracy in the determination of the counts per minute results in only slight inaccuracy in the determination of the actual power level. Correlatively, very precise determinations of power level may be made with only reasonably exact determinations of the counts per minute.

EXAMPLE II

The following data show the response of the power monitor of this invention to variations in power level in one part of the core as induced by moving the various individual control elements while maintaining a constant total reactor power of 15 thermal megawatts. The collimated detector was aligned with a region of the core near one of the six outer control elements. With all but this particular control element out of the core, the monitor indicated 6500 counts per minute. With all but the central control element out of the core, the monitor indicated 12,000 counts per minute as stated in Table I above. With all control elements removed from the core except the outer element farthest from the region being monitored, the monitor indicated 54,000 counts per minute. These data clearly indicate the ability of the power monitor of the present invention to detect local power levels in a reactor core.

In FIGURE 6, an illustration is shown including collimator 41, detector 42, and a schematic illustration of a laterally foreshortened reactor core 72 including fuel assembly 74 with which the collimator is aligned along path 76 and which is surrounded by a plurality of other fuel assemblies 78 which are out of alignment with collimator bore 48. The purpose of this illustration is to describe the basis on which large signal to noise ratios are obtained according to this invention even when monitoring the relative power of a single flow channel of small lateral dimensions in a large power reactor core consisting of hundreds of such channels. This "selectivity" which manifests itself as a high signal to noise ratio is due to the use of collimator 41 in conjunction with the detection at detector 42 of the penetrating radiation emitted by reactor core 72.

When collimator 41 is aligned along path 76 with coolant channel 74 in the center of a large more or less circular reactor core, penetrating radiation is emitted from the entire upper surface of the core toward detector 42 through the conical volume between lines 81 and 83. Most of this radiation is attenuated substantially in passing at a slight angle longitudinally through the walls of collimator 41. Thus, only the penetrating radiation from the vicinity of channel 74 actuates detector 42 since only it is aligned with collimator bore 48 along path 76 in which no collimator wall attenuation occurs.

When collimator 41 is aligned along path 76 with a coolant flow channel 74 located at or near the edge of a large more or less circular core, penetrating radiation from the entire upper surface of the core is emitted toward detector 42 through a conoidal volume between lines 76 and 85, or between lines 76 and 87, depending upon whether the alignment is with the left hand side or the right hand side of the core, respectively. Again, nearly all of this radiation is attenuated significantly by passage at an acute angle longitudinally through the walls of collimator 41, and only that radiation emitted along path 76 effectively actuates detector 42.

Thus, in the present invention the collimator effectively reduces extraneous penetrating radiation emitted from the core surface toward the detector along paths other than path 76. Detector 42 is actuated only by radiation emitted along path 76 in alignment with the collimator bore.

Because the exposed annular radiation area which is a given average radial distance from that part of the core with which the collimator is aligned increases as the square of the radius, the total radiation from these displaced areas may be relatively high compared to that emitted directly along path 76. Accordingly, greater attenuation in the collimator walls is necessary for that radiation arriving at larger angles of misalignment. Accordingly, in the present invention the walls of collimator 40 are relatively thick, especially at the end nearest detector 42 and may have, in order to reduce weight, a decreasing wall thickness with distance from detector 42 toward the radiation source. Accordingly, the generally tapered shape shown in FIGURE 6 may be employed, or the stepped shape which also tapers toward the radiation source as shown in FIGURE 1 may be used. For minimum weight, the collimators used adjacent detector 42 in this invention approximate hyperboloids of revolution.

The extent to which direct penetrating radiation reaches detector 42 by passage through the walls of collimator 41 is determined by the length and diameter of collimator bore 48, the material of construction, and the distance between detector 42 and the reactor core 72. The spherical angle through which such direct radiation may pass along line 76 to detector 42 without passing through the collimator wall illustrated in FIGURE 1 is the apex angle of the conical volume between lines 91 and 93. Radiation emitted toward detector 42 along paths outside of this conical volume, such as along paths in the larger conical volume between lines 95 and 96, passes through and is accordingly attenuated significantly by the walls of collimator 41. Direct radiation from source 98 in channel 74 is not attenuated by the collimator walls whereas radiation from sources 100 and 102 in the channels adjacent channel 74 are substantially attentuated by them. Thus in the system illustrated in FIGURE 6, detector 42 not only rejects radiation emitted from large areas of the reactor core which are displaced radially from alignment with the collimator bore, but also rejects radiation emitted from channels immediately adjacent the channel with which the collimator bore is aligned.

According to this invention, the extent of collimation is predetermined on the basis of the desired selectivity of monitoring, the size of the core, and the distance from the core to the detector. For example, in a power reactor containing 500 individual nuclear fuel-containing coolant flow channels about 4.5 inches on a side, it is entirely possible to "view" and monitor any given individual channel in the entire core by means herein described. On the other hand, if it is desired to monitor larger regions, such as square groups of 4, 9, 16 or 25 channels for example, a lower degree of collimation will permit such an enlargement of the field viewed by the detector according to this invention. Additional detail in this regard is given below in connection with the description of FIGURES 7–10.

In FIGURE 7, another embodiment of the present invention is shown as applied to the power monitoring of a relatively large power reactor in which axial and radial power distributions are monitored. Reactor vessel 130 is provided with vessel head 132 connected by means of flanges 134 and 136. Coolant inlets 138 and 140 are provided opening into the bottom of vessel 130 and coolant outlets 142 and 144 are provided at the upper portion of the vessel just below flange 136. In the particular reactor illustrated, water is introduced as the moderator-coolant at the bottom of the vessel, the water is partially vaporized in passing upwardly through the reactor and a mixture of steam and saturated water is discharged from the coolant outlets. A downwardly tapering turning vane 146 is provided to direct the coolant mixture radially outward through the outlets 142 and 144.

The nuclear chain reacting assembly or core 148, made up of a plurality of fuel-containing assemblies through which the coolant is channeled, is supported by core support means 150 in the lower part of vessel 130. A plurality of control elements 156 containing a nuclear reaction poison extend upwardly from control element drive mechanisms 158 to control the nuclear reaction and the power level in the various regions of the core. This reactor illustrated is representative of large reactors having cores of about 10 feet high and 10 feet in diameter, or larger, and containing as many as 40 critical masses of fissionable material. In such reactors, substantial local power changes can occur which do not affect extensively the total power level of the entire core. Accordingly, as shown in FIGURE 7, means are provided for monitoring the power level of a plurality of regions throughout the entire transverse surface of the core to determine the radial power distribution. Disposed more or less uniformly throughout this surface above the core is a plurality of internal collimating elements 160. The structure of one form of these elements is detailed in FIGURE 8 subsequently described, but in general each consists of a lower mixture section which is open at both ends and aligned axially with an upper collimating section which is preferably closed at both ends. The axis of each internal collimating element is aligned with the particular region in the core to be monitored and with an external collimator 162 containing detector 164 as indicated previously in connection with FIGURE 1. A plurality of stationary collimated detectors may be provided, one for each of the internal collimating elements 160 used in the pressure vessel. In FIGURE 7 a single collimated detector is movably supported by reciprocable arm 163 which is in turn slidably mounted on support ring 165. The detector may thus be moved into successive alignment with each element 160.

An additional collimator 166 having detector 168 may be employed around the periphery of core 148 in order to monitor the power level of a plurality of regions throughout the lateral surface of the core to determine the axial power distribution. A plurality of stationary collimated detectors may be distributed throughout the surface of an imaginary cylinder coaxially surrounding core 148. In FIGURE 7 the collimated detector is movably supported by means of reciprocable arm 167 which in turn is slidably mounted on support ring 169. The collimated detector may thus be moved to any point on the imaginary cylinder in order to determine the axial power distribution of the core.

In operation, part of the mixture of vapor and liquid coolant discharging from the entire upper surface of core 148 enters the lower mixture section of collimating elements 160, and passes upwardly to the upper open end where it is discharged into the main coolant stream. The lower mixture section of tube 160 thus contains a representative sample of the vapor-liquid coolant mixture discharging from a particular region or fuel assembly of the reactor core. External collimator 162 is aligned with one of these internal collimator elements 160, and the penetrating radiation from a source 170, for example, passes upwardly through part of the core, the lower mixture section and the upper collimating section along path 172 through external collimator 162 to detector 164. The radiation is attenuated to an extent which is an inverse function of the vapor fraction of the coolant leaving the core, a sample of which passes through the mixture section of element 160. Considerable added attenuation of misaligned radiation, that is radiation arriving at detector 164 along paths other than path 172, is obtained by virtue of the presence of internal collimating elements 160. It is not necessary that internal collimating elements 160 be provided with the mixture section however, and one preferred embodiment of this invention utilizes an internal collimator consisting of a tube closed at both ends and extending from adjacent the core to the vessel wall and aligned with the bore of an external collimator.

FIGURE 8 is a detailed longitudinal cross-section view of the internal collimator tube 160 shown in FIGURE 7. It extends from a point just above the coolant outlet end 174 of the reactor core through turning vane 146 and to a point adjacent the inner surface of reactor vessel head 132. The inlet end 176 of tube 160 is open while the other end 178 is preferably closed. Intermediate these ends is a transverse divider 180 and immediately adjacent the divider one or more openings 182 are provided in the tube wall. That portion of tube 160 between divider 180 and end 178 is an empty collimating section 184 while that portion between the divider and inlet 176 is a mixture section 186. The sample of partially vaporized coolant passes upwardly through mixture section 186 and discharges through openings 182. The penetrating radiation originating in the core at a point 190 passes upwardly along path 192 through mixture section 186 where it is attenuated to an extent dependent upon the degree of vaporization of the coolant and the power level in the particular channel. The attenuated radiation passes through collimating section 184 and through vessel head 132 to the superjacent detecting means, not shown but indicated in FIGURE 7.

Referring now to FIGURES 9 and 10, a detailed longitudinal and transverse cross-section view, respectively, are shown illustrating the detail of one form of construction of the detector collimator 162 referred to in FIGURE 7. This collimator is constructed with a center bore 200 and walls 202 made up of a plurality of concentric mild steel pipe sections each of increasing length to approximate the hyperboloid of revolution previously described. In this particular embodiment of this invention, six concentric tubular sections having the following dimensions were used.

*Table II*

| Length (inches) | Nominal Diameter (inches) | Schedule |
|---|---|---|
| 15.5 | 5 | 120 |
| 19 | 4 | 40 |
| 24 | 3.5 | 40 |
| 34 | 3 | 40 |
| 47 | 2.5 | 40 |
| 57 | 2 | 80 |

Disposed within bore 200 is a bundle of collimating tubes 204, in this case three nominal 0.5 schedule 40 pipes, extending substantially the full length of bore 200. Considerable increase in selectivity of the collimator results from the addition of this collimating tube bundle. In the upper or heavy end of collimator 200 is provided a position for a radiation detector 206.

EXAMPLE III

A boiling water power reactor of the type described in connection with FIGURE 7 rated at 656 thermal megawatts had 488 fuel channels 12 feet long and 4.5 inches on a side. Eighteen internal collimating tubes of the type described in connection with FIGURE 8 and an external detector collimator of the type described in FIGURES 9 and 10 were used. The detector was a Hornyak button spaced 360 inches from the top of the core. It was determined that signal to noise ratios about 350 were obtained with the device when aligned with the edge of the core and ratios of about 900 were obtained with this device aligned with the center of the core. It was further determined that the detector was effectively actuated only by penetrating radiation emitted upwardly from an area only 3 inches in diameter on the top of the core. Effectively then, the embodiment of this invention as described in FIGURES 7 through 10 successfully monitored the power level of a single 4.5 inch by 4.5 inch fuel channel in a boiling water reactor core containing 487 other fuel channels located 30 feet away inside a 5.5 inch thick steel reactor vessel.

In the practice of the present invention, penetrating radiation has been collimated and utilized to monitor the power of small local regions of a reactor core without seals or penetrations extending through the reactor vessel and by means of instruments of moderate accuracy located well away from the core and outside the vessel.

The penetrating radiation contemplated includes fast neutrons such as about 1 mev. and gamma ray radiation and mixtures of fast neutron and gamma ray radiation.

The detector elements suitable for use in the practice of this invention depends of course upon the nature of the penetrating radiation. For fast neutrons, the conventional fission counter or scintillation counters may be employed. One particular detector element which has been found very suitable for fast neutrons is the so-called Hornyak button described by Alfred Hornyak in "Review of Scientific Instruments," vol. 23, (1952) at page 264. The button consists of an optically clear hydrogeneous plastic material to which is added about 10 percent by weight of uniformly dispersed finely divided zinc sulfide. Suitable button may be made by mixing 1.5 grams of 8–25 microns size particles of zinc sulfide and 10 grams of polymethyl methacrylate (Lucite) molding powder and molding at 2000 p.s.i. and 120° C. to produce a cylindrical "button" about 1 inch in diameter and about 0.25 inch thick. Visible light is emitted by this material under fast neutron irradiation. The scintillation is detected by means of a photo multiplier tube, a 5819 is suitable, placed adjacent the material. The usual electronic instrumentation employed with photo multiplier tubes in radiation detection and counting may be employed. This includes the conventional amplifiers, discriminators, rectifiers, detectors, indicators, recorders, and the like.

With gamma ray radiation, scintillation counters may be used in conjunction with a sodium iodide crystal, or the more conventional ion chambers and Geiger tubes may be employed.

In either case, it is conventional to employ discriminator circuits so that signals generated by radiation having energies below some predetermined limit are not effective in actuating the recording and indicating devices. For example, neutrons below about 1 mev. including the extraneous radiation may be rejected to increase the selectivity and the signal to noise ratio by rejecting the low energy "noise."

The collimators of this invention are preferably fabricated from materials that provide high attenuation of the radiation being used to monitor local power levels. For both fast neutrons and gamma ray radiation, collimators of lead, boron steel, mild steel, and the like may be used. For fast neutrons, the hydrogeneous plastics may be used, although they will not attenuate gamma rays appreciably. The preferred material is mild steel.

This application is a continuation of my copending application Serial No. 793,117, filed February 13, 1959, and assigned to a common assignee, now abandoned.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A method for monitoring the power distribution throughout a nuclear chain reacting assembly disposed in a reactor vessel and having a plurality of nuclear fuel-containing coolant flow channels through which a liquid coolant is passed, which method comprises the steps of collimating penetrating radiation emitted axially from a relatively small local region of said assembly including at least one of said flow channels, measuring the intensity of the collimated radiation at a point remote from said assembly and outside of said vessel, the attenuation of said radiation varying with changes in the density and the temperature of said coolant through which it passes and the power level in said channel from which it issues whereby the collimated radiation has an intensity which is a direct function of said power level, and repeating the radiation collimation and collimated radiation intensity measurement steps for a plurality of said relatively small local regions to determine said power distribution.

2. A method according to claim 1 in combination with the step of controlling the nuclear chain reacting assembly to maintain a predetermined power distribution therein.

3. A method according to claim 1 wherein said penetrating radiation is emitted axially from an end of at least one coolant flow channel.

4. A method according to claim 1 where said penetrating radiation is emitted laterally from said assembly.

5. In the operation of a nuclear chain reacting assembly disposed in a reactor vessel and having a plurality of nuclear fuel-containing coolant flow channels through which a coolant is passed to absorb heat liberated by nuclear reaction in said fuel and having a plurality of nuclear reaction poison-containing control elements distributed in said assembly to control the reaction, the improvement which comprises collimating penetrating radiation emitted from said assembly to isolate that emitted from each of a plurality of relatively small local regions and to attenuate in each case such radiation emitted from other regions of said assembly, measuring at a plurality of points remote from said assembly and outside said vessel the intensity of the collimated radiation from each of said plurality of relatively small local regions of said assembly, and controlling the assembly by means of said local control elements in accordance with radiation intensities thus measured to maintain a predetermined power distribution throughout said assembly.

6. An apparatus for monitoring the power distribution in a nuclear chain reacting assembly which comprises means for collimating penetrating radiation emitted from a plurality of relatively small local regions of said assembly, said collimating means comprising an elongated element fabricated of a material providing a high attenuation of said penetrating radiation and having a central opening of relatively small diameter, and means at a point remote from said assembly for detecting the collimated radiation emitted from said plurality of said local regions, said elongated element having a wall thickness which is relatively thick at its end adjacent the detecting means and which wall thickness decreases with distance from the detecting means toward the chain reacting assembly.

7. An apparatus for monitoring the power distribution in a nuclear chain reacting assembly which comprises means for collimating penetrating radiation emitted from a plurality of relatively small local regions of said assembly, said collimating means comprising an elongated element fabricated of a material providing a high attenuation of said penetrating radiation and having a central opening of relatively small diameter, and means at a point remote from said assembly for detecting the collimated radiation emitted from said plurality of said local regions, said elongated element having a wall thickness which is relatively great at its end adjacent the detecting means and which wall thickness decreases with distance from the detecting means toward the chain reacting assembly, the shape of said elongated element thus approximating a hyperboloid of revolution.

8. An apparatus for monitoring the power level in each of a plurality of relatively small local regions of a nuclear chain reacting assembly enclosed within a vessel which comprises a plurality of penetrating radiation detecting means disposed at points remote from said assembly and outside said vessel, a plurality of radiation collimating means disposed between said detecting means and said assembly, each of said collimating means being aligned with a corresponding one of said plurality of relatively small local regions of said assembly, each of said collimating means being disposed immediately adjacent a corresponding one of said detecting means.

9. An apparatus for monitoring the power level in a particular region of a nuclear chain reacting assembly enclosed within a vessel which comprises penetrating radiation detection means disposed at a point remote from said assembly and outside of said vessel, and radiation collimating means disposed between said detecting means and said assembly and aligned with the particular region to be monitored, said collimating means including an elongated external collimating element having a central bore and fabricated of material providing high attenuation of said penetrating radiation and disposed immediately adjacent said detecting means outside of said vessel, and an elongated internal collimating element having a central bore and disposed inside said vessel adjacent said assembly and aligned with the central bore of said external collimating element.

10. An apparatus according to claim 9 wherein said internal collimating element extends from a point adjacent said nuclear chain reacting assembly to a point adjacent the inner surface of said vessel, said element being open at the end adjacent said assembly and closed at the other end and provided with a transversed divider intermediate these ends and with at least one opening in the wall thereof adjacent said divider nearest said assembly.

11. An apparatus according to claim 9 wherein said external collimating element has a shape which generally tapers toward the radiation source.

References Cited in the file of this patent

Proceedings of 1st Geneva Conference on Peaceful Uses of Atomic Energy, 1955, vol. 3, pages 214, 223, 224, 259, 260; published by U.N.

Proceedings of 1st Geneva Conference on Peaceful Uses of Atomic Energy, 1955, vol. 2, pages 93, 94; published by U.N.

Review of Scientific Instruments, vol. 29, No. 11, 250/NEU/D, November 1958, pages 982, 983.

Abson: Proceedings of 2nd Geneva Conference on Peaceful Uses of Atomic Energy, 1958, vol. 11, pp. 505–508; published by U.N.

UNITED STATES PATENT OFFICE
CERTIFICATE OF CORRECTION

Patent No. 3,165,446                          January 12, 1965

Samuel Untermyer II

It is hereby certified that error appears in the above numbered patent requiring correction and that the said Letters Patent should read as corrected below.

Column 4, line 25, for "interduced" read -- introduced --; column 6, line 50, for "With the higher" read -- With higher --; column 7, Table I, second column, line 1 thereof, for "5 0" read -- 5.0 --; column 8, line 46, for "atteunated" read -- attenuated --; line 48, for "attentuated" read -- attenuated --; column 11, line 35, for "button" read -- buttons --; column 11, line 36, for "microns" read -- micron --; column 12, line 30, for "where" read -- wherein --.

Signed and sealed this 15th day of June 1965.

(SEAL)
Attest:

ERNEST W. SWIDER                                EDWARD J. BRENNER
Attesting Officer                                    Commissioner of Patents